United States Patent
Kankar et al.

(10) Patent No.: US 8,112,063 B2
(45) Date of Patent: Feb. 7, 2012

(54) METHOD AND A SYSTEM FOR MINIMIZING ROAMING COST IN A MOBILE COMMUNICATION NETWORK

(75) Inventors: Pankaj Kankar, New Delhi (IN); Sunil Chandra, Bangalore (IN); Sougata Mukherjea, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 871 days.

(21) Appl. No.: 12/055,643

(22) Filed: Mar. 26, 2008

(65) Prior Publication Data
US 2008/0176532 A1 Jul. 24, 2008

Related U.S. Application Data

(63) Continuation of application No. 11/531,885, filed on Sep. 14, 2006, now abandoned.

(51) Int. Cl.
*H04M 11/00* (2006.01)
*H04M 3/20* (2006.01)
*H04M 15/00* (2006.01)
*H04W 40/00* (2009.01)
*H04W 4/00* (2009.01)

(52) U.S. Cl. ............ 455/406; 455/432.1; 455/445; 455/432; 455/419; 379/114.01

(58) Field of Classification Search .............. 455/445, 455/406, 432.1
See application file for complete search history.

(56) References Cited

U.S. PATENT DOCUMENTS

| | | | |
|---|---|---|---|
| 2002/0197991 A1* | 12/2002 | Anvekar et al. | 455/432 |
| 2003/0092440 A1 | 5/2003 | Warrier et al. | |
| 2005/0164702 A1 | 7/2005 | Carlson et al. | |
| 2005/0286690 A1* | 12/2005 | Thommana et al. | 379/114.01 |
| 2006/0099941 A1* | 5/2006 | Kim et al. | 455/419 |
| 2006/0234712 A1* | 10/2006 | Fallis et al. | 455/445 |

OTHER PUBLICATIONS

Kankar, et al., U.S. Appl. No. 11/531,885, Office Action Communication, Feb. 29, 2009, 9 pages.

* cited by examiner

*Primary Examiner* — Dwayne Bost
*Assistant Examiner* — Timothy Pham
(74) *Attorney, Agent, or Firm* — Gibb I.P. Law Firm, LLC; Derek S. Jennings

(57) ABSTRACT

The present invention deals with a method and system for routing a call in a mobile communication network. The method comprises receiving a message by a caller prevailing network corresponding to a caller from a callee home network corresponding to a callee, if the callee is roaming. The message is received in response to the call being initiated by the caller for the callee. The message can comprise a redirection information corresponding to the callee in roaming. The method further comprises solving a predefined criterion for routing the call based on the redirection information in the message and connecting the call based on solution of the predefined criterion.

9 Claims, 4 Drawing Sheets

METHOD AND A SYSTEM FOR MINIMIZING ROAMING COST IN A MOBILE COMMUNICATION NETWORK

CROSS-REFERENCE TO RELATED APPLICATIONS

This application is a continuation of U.S. application Ser. No. 11/531,885 filed Sep. 14, 2006, the complete disclosure of which, in its entirety, is herein incorporated by reference.

FIELD OF THE INVENTION

The present invention relates generally to mobile communications and more specifically, to a method and system for minimizing roaming costs in a mobile communication network.

BACKGROUND OF THE INVENTION

In a mobile communication network a subscriber gets registered with a network for accessing various communication services. The network can be a home network or a visited network for a subscriber based on the registration of the subscriber with the network. A home network is a network with which a subscriber has subscribed for accessing various communication services. However, a visited network is a network with which a subscriber, while roaming, registers temporarily for availing various communication services. The various communication services can be for example, initiating a call or receiving a call. Generally, a subscriber initiating a call in a mobile communication network is referred as a caller and a subscriber receiving a call in a mobile communication network is referred as a callee.

Conventionally, when a call is initiated by a caller for a callee present in a callee home network corresponding to the callee, caller prevailing network corresponding to the caller routes the call to the callee home network. In this case the call routed from the caller prevailing network to the callee home network is charged to the caller. The caller prevailing network is a network in which the caller is currently registered to access the wireless telecommunication services. The caller prevailing network can be for example a home network for the caller or a visited network for the caller.

Further, in a scenario when the callee is roaming in a callee visited network, then the callee home network routes the call to the callee visited network in which the callee is roaming. In this case, the originating leg, i.e., from caller prevailing network to the callee home network, is charged to the caller. However, the terminating leg, i.e., the call routed from the callee home network to the callee visited network, is charged to the callee. Therefore, a roaming charge is levied on the callee for receiving the call.

The U.S. patent application US20050164702A1, titled, "Call Handling Scheme to reduce Roaming Charges" assigned to Carlson, Steven I.; et al., proposes a scheme for forwarding the call made to a subscriber who is roaming such that it results in cost savings for the roaming subscriber. In this patent application, a second switch receives an indication from a roaming network that a call forwarded by the roaming network has been dropped by the roaming network, and in response to receiving the indication, forwards the call from a first switch.

Another method as disclosed in the U.S. patent application US20030092440A1, titled, "System and Method For Minimizing International Roaming Costs", assigned to Warrier, Unnikrishnan S.; et al., deals with minimizing international roaming costs that leverages an existing communication network to convert roaming communication sent to and from a mobile telephone into a series of local telephone calls to and from the communication network. Using a universal address, subscribers of the communication system can initiate or participate in real-time communication through the network while roaming outside of a home system, without incurring roaming charges.

However, reducing roaming cost for the callee might result in an increased cost for the caller which is an undesirable situation for the caller. Also using temporary numbers for reducing roaming cost for the callee requires a universal database accessible to each of the networks in the mobile communication network.

SUMMARY OF THE INVENTION

An aspect of the invention is to provide a method and a system for minimizing cost of receiving a call while roaming in a communication network, which is not home network.

In order to fulfill above aspect, the method comprises receiving a message by a caller prevailing network corresponding to a caller from a callee home network corresponding to a callee. The message is received in response to the call being initiated by the caller for the callee. The message can comprise redirection information corresponding to the callee in roaming. The redirection information can be a temporary number assigned to the callee in a callee visited network or can be an address of a Mobile Switch Center (MSC) of the callee visited network.

Thereafter, the caller prevailing network solves a predefined criterion for routing the call based on the redirection information in the message. The predefined criterion can be comparing costs of routing the call to the callee through different routes.

The call is then connected based on solution of the predefined criterion. For example, the call is routed so as to minimize the cost of routing the call to the callee.

A system is also proposed for minimizing the cost of routing the call. The system comprises a messaging sub-module residing at the callee home network and a routing-rule module residing at the caller prevailing network. The messaging sub-module sends the message to the caller prevailing network and the routing-rule module solves the predefined criteria based on the redirection information received in the message and routes the call based on the solution of predefined criterion.

BRIEF DESCRIPTION OF THE DRAWINGS

The foregoing objects and advantages of the present invention for a method and a system for routing a call in a communication network may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION

Figure 1:
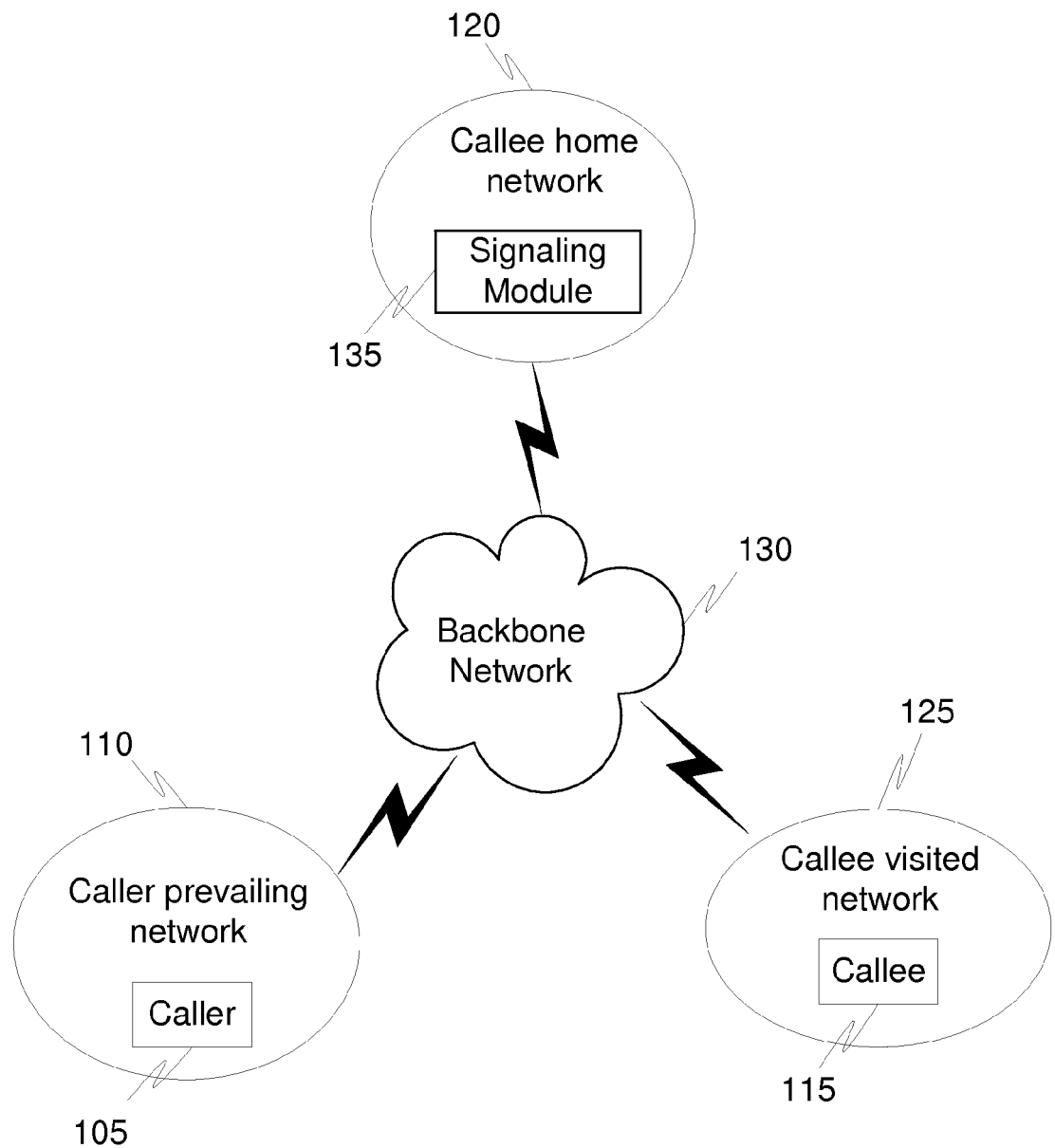
FIG. 1 illustrates a block diagram of an exemplary embodiment depicting a caller and a callee in a communication network in accordance with an embodiment of the present invention.

Before describing in detail embodiments that are in accordance with the present invention, it should be observed that the embodiments reside primarily in combinations of method steps and apparatus components related to a method and apparatus for routing a call in a communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art.

It will be appreciated that embodiments of the invention described herein may be comprised of one or more conventional processors and unique stored program instructions that control the one or more processors to implement, in conjunction with certain non-processor circuits, some, most, or all of the functions of the method and apparatus for facilitating speech classification. The non-processor circuits may include, but are not limited to, a radio receiver, a radio transmitter, signal drivers, clock circuits, power source circuits, and user input devices. As such, these functions may be interpreted as steps of a method for routing a call in a communication network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to the various embodiments, the present invention deals with minimizing roaming costs when a caller calls a callee who is roaming outside of a callee home network. The roaming cost is reduced by removing an incoming call charges from the callee. A user who initiates a call is known as the caller and a user who the caller calls is known as the callee. The callee home network is a network with which the callee has subscribed for accessing various communication services. When the callee roams out of the callee home network, the callee can temporarily register with a callee visited network. A callee visited network is a network with which a callee, while roaming, is registered temporarily for availing various communication services. Those skilled in the art will realize that the callee may not always be assigned a temporary address in the callee visited network.

Referring now to FIG. 1, a block diagram of an exemplary embodiment depicting a caller and a callee in a wireless communication network is shown in accordance with an embodiment of the present invention. A caller 105 can be in a caller prevailing network 110 at a given point of time. Caller prevailing network 110 can be a home network of caller 105 or a visited network that caller 105 roams into. Those skilled in the art will realize that caller prevailing network 110 is the home network of caller 105 if caller has subscribed to the caller prevailing network 110 for accessing various communication services. The home network of the caller maintains specific-information corresponding to caller 105 in a home location register (HLR). In an embodiment of the invention the specific-information corresponding to caller 105 can be for example, a unique subscriber identity of caller 105, mobile number associated with caller 105, service preferences and charging plans corresponding to caller 105. Further, caller prevailing network 110 can be a visited network of caller 105 with which caller 105 is registered temporarily to access various communication services. However, various embodiments of the present invention are independent of whether caller prevailing network 110 is a caller home network or caller visited network. Those skilled in the art will recognize and appreciate that the specifics of this illustrative example are not specifics of the invention itself and that the teachings set forth herein are applicable in a variety of alternative settings.

Caller 105 may wish to call a callee 115. Callee 115 can be in callee visited network 125 and can be registered temporarily with callee visited network 125. In an embodiment of the present invention, like in a standard Internet Protocol (IP) routing mechanism, caller prevailing network 110 can route calls that are destined for callee 115 to callee home network 120. The call can be routed over a backbone network 130. Callee home network 120 can, then, forward the call to callee visited network 125 over backbone network 130. Backbone network 130 acts primarily as a conduit for call traffic to and from other networks such as caller prevailing network 110, callee home network 120 and callee visited network 125.

In an embodiment of the present invention, callee home network 120 can comprise a signaling module 135. Signaling module 135 can be configured for receiving an addressing information of callee 115 from callee visited network 125. When caller 105 initiates a call to callee 115, callee home network 120 realizes that callee 115 is roaming in callee visited network 125 and sends the addressing information to caller prevailing network 110. The addressing information can be a message comprising an identity of callee visited network 125 and identity of callee 115 in callee visited network 125.

Depending on the addressing information of callee 115 and on a predefined criterion, caller prevailing network 110 can either route the call, which is destined for callee 115, to callee home network 120 or directly to callee visited network 125. If the call is routed to callee home network 120, callee home network 120 can forward the call to callee visited network 125. The predefined criterion is described in detail in conjunction with FIG. 3.

Those skilled in the art will realize that if caller prevailing network 110 routes the call directly to callee visited network 125, callee 115 may not need to pay for receiving the call. However, if the call is routed through callee home network 120, callee 115 may need to pay for the forwarding of call from callee home network 120 to callee visited network 125.

Figure 2:
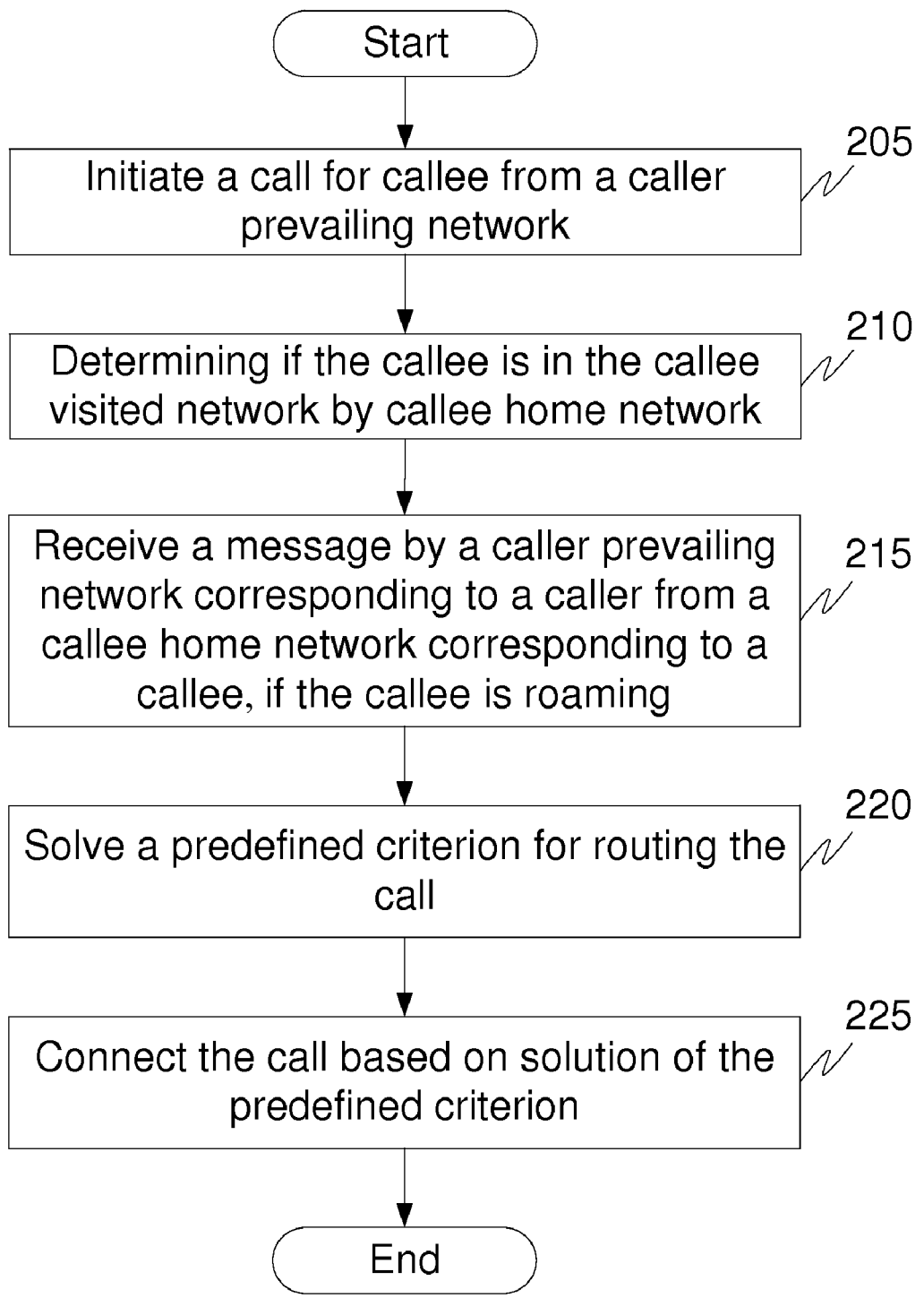
FIG. 2 illustrates a flow diagram of a method for routing a call in a communication network in accordance with an embodiment of the present invention.

Turning now to FIG. 2, a flow diagram of a method for routing a call in a wireless communication network is shown in accordance with an embodiment of the present invention. A caller, who is in a caller prevailing network, may wish to call a callee, who may be roaming. As mentioned earlier, the caller prevailing network can be the caller's home network or the caller's visited network. While roaming, the callee may have roamed out of a callee home network and roamed into a callee visited network.

The caller initiates the call from the caller prevailing network for the callee, who is in the callee visited network, at step 205. When the caller initiates the call, the callee home network determines that the callee is in the callee visited network, at step 210. The caller prevailing network can, then, receive a message from the callee home network at step 215. The message can be sent over an underlying signaling infrastructure, also known a backbone network. The message can comprise redirection information corresponding to the callee in roaming. Those skilled in the art will realize that the redirection information can be a temporary number assigned to the callee by the callee visited network or an address of a Mobile Switch Centre (MSC) of the callee visited network.

In an embodiment of the present invention, where the redirection information is the temporary number assigned to the callee, the caller prevailing network can directly connect the call to the callee using the temporary number. In another embodiment of the present invention, where the redirection information is the address of the MSC of the callee visited network, the call can be routed to the callee visited network using the address of the MSC.

Now, based on the redirection information in the message, the caller prevailing network solves a predefined criterion for routing the call at step 220. In an embodiment of the present invention, the predefined criterion can be a cost of routing the call. The caller prevailing network can determine a route such that if the call is forwarded via that route to the callee, the cost of routing the call is minimized for the callee while making sure that the cost of routing the call for the caller does not increases. The predefined criterion is described in detail in FIG. 3.

In another embodiment of the present invention, the solving step 220 can comprise providing the caller with a first-routing-option and a second-routing-option. The first-routing-option can correspond to the first cost and the second-routing-option can correspond to the second cost. The first-routing-option can be a route corresponding to the first cost, for instance, a route where the call is routed directly to the callee visited network. The second-routing-option can be a route corresponding to the second cost, for instance, a route where the call is routed to the callee visited network through the callee home network. The predefined criterion, in this embodiment, can be the caller selecting one of the first-routing-option or the second-routing-option.

The call is, then, connected to the callee at step 225 based on solution of the predefined criterion. The solution of the predefined criterion is essentially a route via which the call can be made to the callee. The route can be, for example, a direct route from the caller prevailing network to the callee visited network, or the route can be from the caller prevailing network to the callee visited network through the callee home network.

Figure 3:
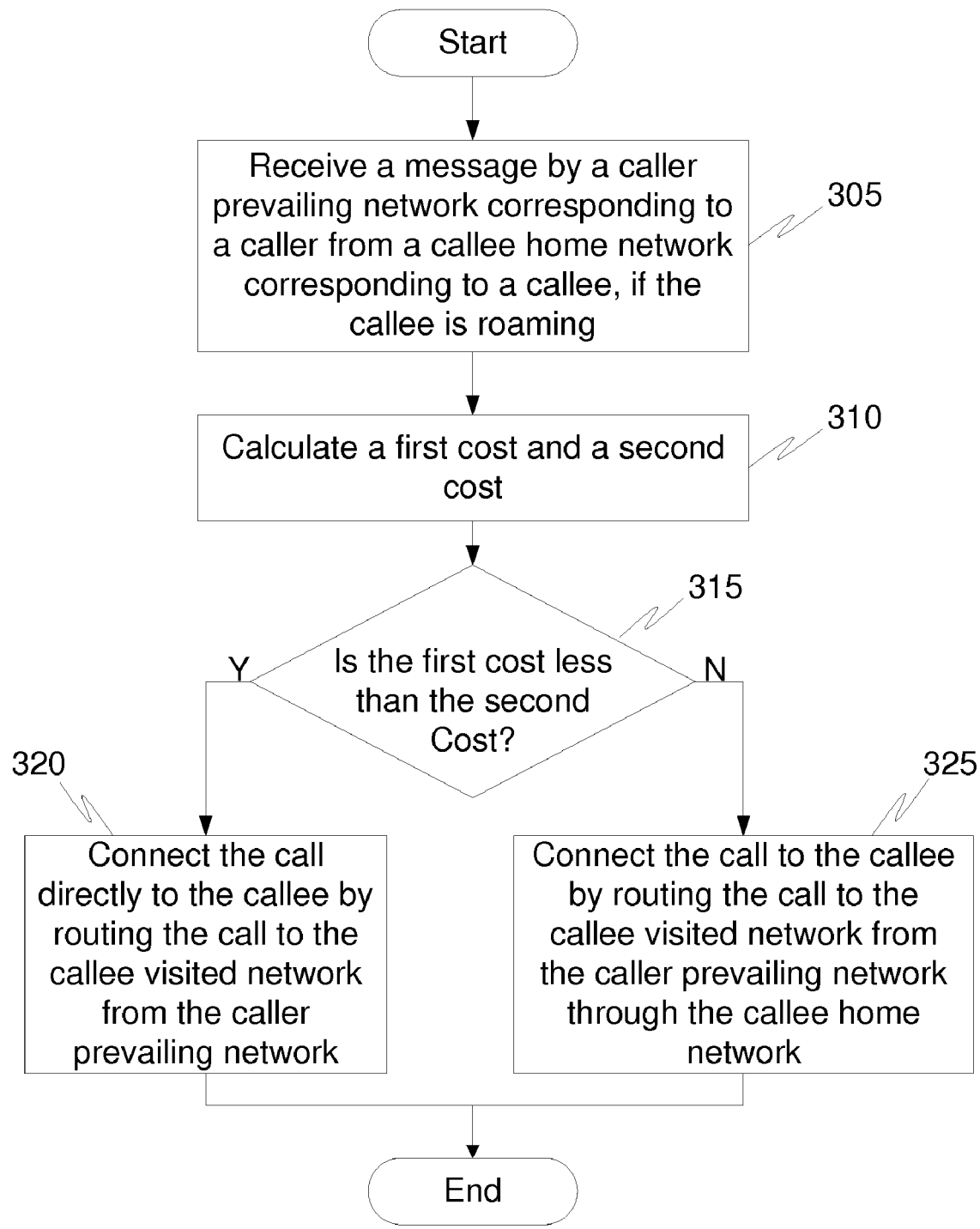
FIG. 3 illustrates a flow diagram of a method for minimizing cost of receiving a call in roaming in a communication network in accordance with an embodiment of the present invention.

Turning now to FIG. 3, a flow diagram of a method for minimizing cost of receiving a call in roaming in a wireless communication network is shown in accordance with an embodiment of the present invention. A caller in a caller prevailing network initiates a call for a callee who is outside the callee home network. In accordance with the present invention, the callee can roam into a callee visited network. Upon initiating the call for the callee, the caller prevailing network can receive a message from the callee home network at step 305. As mention earlier, the message can comprise redirection information corresponding to the callee in roaming. The redirection information can be, for instance, a temporary number assigned to the callee by the callee visited network or an address of a Mobile Switch Centre (MSC) of the callee visited network.

The redirection information can enable the caller prevailing network to directly connect to the callee in the callee visited network. As mentioned in FIG. 2, a predefined criterion for routing the call is solved based on the redirection information in the message. The predefined criterion can comprise comparing two costs. The caller prevailing network can calculate the two costs at step 310 for routing the call. The two costs, herein, are referred to as a first cost and a second cost. The first cost can correspond to cost of the call born by caller while routing the call to the callee visited network from the caller prevailing network directly based on the redirection information. The second cost can correspond to cost of the call born by caller while routing the call to the callee visited network from the caller prevailing network through the callee home network.

The caller prevailing network routes the call in such a way, so as to minimize the cost of the call for the callee while making sure that the cost of the call born by the caller is not increased. For this purpose, the caller prevailing network determines if the first cost is lower than the second cost, at step 315. If it is determined that the first cost is lower than or equal to the second cost, the call can be connected directly to the callee by routing the call to the callee visited network from the caller prevailing network, at step 320. For example, the callee can roam into the caller prevailing network. In this situation, the caller prevailing network and the callee visited network is the same. Thus, the cost of routing the call directly to the callee visited network, the first cost, can be cheaper than routing the call through the callee home network, the second cost. The caller prevailing network can, then, choose to route the call directly to the callee visited network.

The caller prevailing network can directly route the call to the callee visited network by using the redirection information that the caller prevailing network receives from the callee home network at step 305. The caller prevailing network can extract information regarding the addressing of the callee from the redirection information. The addressing information can be a temporary number assigned to the callee by the callee visited network or an address of a MSC of the callee visited network. Those skilled in the art will realize that in an embodiment, where the redirection information comprises the temporary number assigned to the callee, the call can be directly connected to the callee using the temporary information. In another embodiment, where the redirection information comprises the address of the MSC of the callee visited network, the call can be routed to the callee visited network of the callee based on the address of the MSC.

If it is determined that the second cost is lower than the first cost, the call can be routed from the caller prevailing network to the callee visited network through the callee home network, at step 325. Those skilled in the art will realize that this can be done in the conventional manner. For example, the caller prevailing network and the callee home network can have certain agreements and low interconnect charges resulting in reduction of cost for the calls made between the caller prevailing network and the callee home network. Whereas, the caller prevailing network and the callee visited network might have high interconnect charges. In this case, the cost of routing the call to the callee visited network through the callee home network, second cost, can be cheaper for the caller than the cost of routing the call directly to the callee visited network, the first cost. The caller prevailing network can, then, choose to route the call to the callee visited network through the callee home network.

Additionally, in an embodiment of the present invention, the caller prevailing network provides the caller with a first-routing-option and a second-routing-option. The first-routing-option can correspond to the first cost and the second-routing-option can correspond to the second cost. The first-routing-option can be a route corresponding to the first cost, for instance, a route where the call is routed directly to the callee visited network. The second-routing-option can be a route corresponding to the second cost, for instance, a route where the call is routed to the callee visited network through the callee home network. The predefined criterion, in this case, can be the caller selecting one of the first-routing-option or the second-routing-option. If the caller selects the first-routing-option, the call is routed directly to the callee visited network. If the caller selects the second-routing-option, the call is routed to the callee visited network through the callee home network. For instance, there can be situations where the caller can choose a route that is cheaper for the callee but is costlier for the caller. For example, in case the call is routed directly to the callee visited network from the caller prevailing network, the callee may not have to pay for receiving the call. However, the caller may have to pay more to route the call directly to the callee visited network than to route the call through the callee home network. The caller prevailing network can inform the caller about the cost. The caller can, still, route the call directly to the callee visited network in interest of the callee, even if the caller has to pay more.

In an embodiment of the present invention, the callee can be alerted that the call is direct to the callee visited network from the caller prevailing network. The callee can be alerted by flashing an alert message on an electronic device used by the callee to receive the call. The callee can either accept or decline the call upon receiving the alert. For example, if the call is direct to the callee visited network, the callee may not have to pay for the call. In this case, the callee may accept the call. However, if the call is routed to the callee visited network through the callee home network, the callee may have to pay for the forwarding of call from the callee home network to the callee visited network. In this case the callee may not want to pay for the call and can decline the call.

Figure 4:
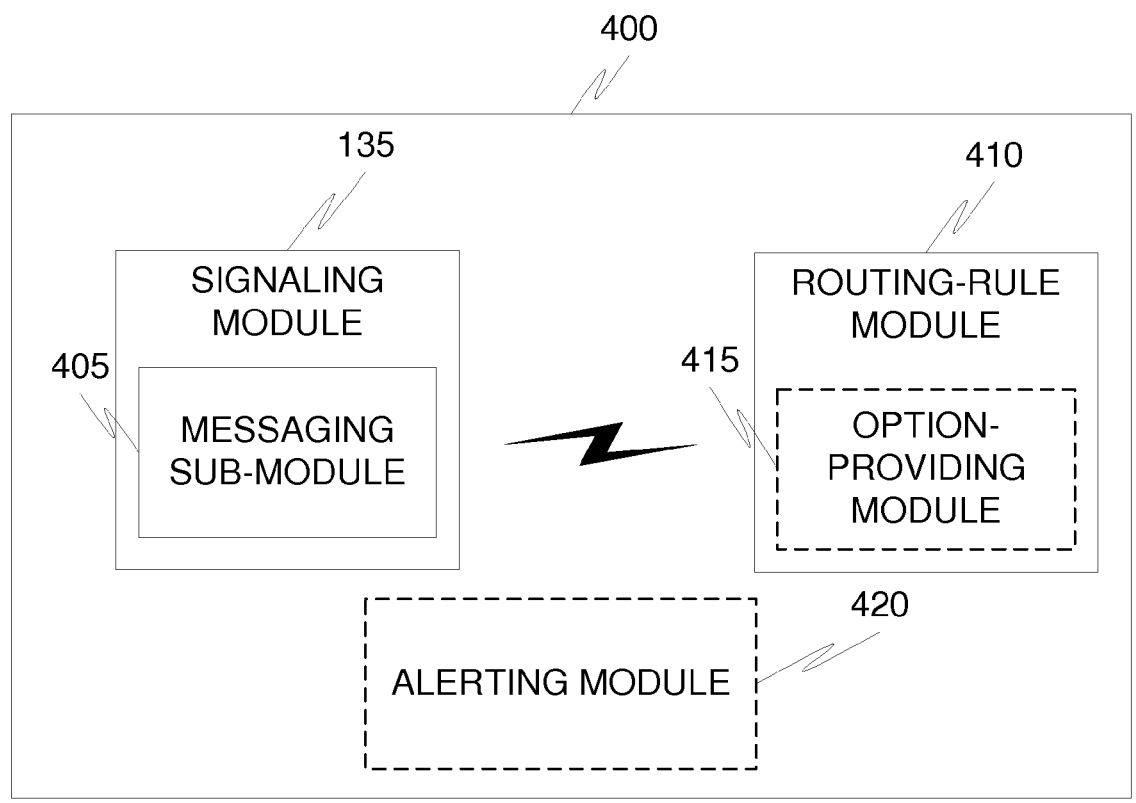
FIG. 4 illustrates a block diagram of a system for routing a call in a communication network in accordance with an embodiment of the present invention.

Referring now to FIG. 4, a block diagram of a system 400 for routing a call in a wireless communication network is shown in accordance with an embodiment of the present invention. A caller in a caller prevailing network may wish to call a callee. The callee may roam out of a callee home network and roam into a callee visited network. The callee home network can comprise a signaling module 135 as shown in FIG. 1. Signaling module 135 is configured to receive an addressing information of the callee from the callee visited network. The addressing information can be an identity of the callee visited network or an identity of the callee in the callee visited network, for example a temporary identity of the callee in the callee visited network.

Signaling module 135 comprises a messaging sub-module 405. When the caller initiates a call for the callee, messaging sub-module 405 can send a message from the callee home network to the caller prevailing network. The message can comprise redirection information corresponding to the callee in roaming. As mentioned earlier, the redirection information can be, for instance, a temporary number assigned to the callee by the callee visited network or an address of a Mobile Switch Centre (MSC) of the callee visited network or any other relevant information.

Based on the redirection information and a predefined criterion, a routing-rule module 410, residing on the caller prevailing network, can route the call. Routing-rule module 410 solves the predefined criterion for routing the call. In an embodiment of the invention, the predefined criterion can be comparing two costs such that a cost for routing the call for the callee is minimized while making sure that the cost of the call born by the caller is not increased. A first cost can be a cost corresponding to the call being routed directly to the callee visited network and a second cost can be the call being routed to the callee visited network through the callee home network. If the first cost is lesser than the second cost, routing-rule module 410 connects the call directly to the callee, based on the redirection information, by routing the call to the callee visited network. Routing-rule module 410 obtains the redirection information of the callee from the message received at the caller prevailing network from the callee home network. If the second cost is lesser than the first cost, routing-rule module 410 routes the call to the callee visited network through the callee home network. For example, the caller prevailing network makes call to the callee home network and the callee home network forwards the call in turn to the callee visited network.

In an embodiment of the present invention, routing-rule module 410 comprises an option-providing module 415. Option-providing module 415 provides a first-routing-option and a second-routing-option to the caller. The first-routing-option can be a route corresponding to the first cost, for instance, a route where the call is routed directly to the callee visited network. The second-routing-option can be a route corresponding to the second cost, for instance, a route where the call is routed to the callee visited network through the callee home network. The predefined criterion, in this case, can be the caller selecting one of the first-routing-option or the second-routing-option. If the caller selects the first-routing-option, routing-rule module 410 routes the call directly to the callee visited network. If the caller selects the second-routing-option, routing-rule module 410 routes the call to the callee visited network through the callee home network.

For instance, there can be situations where the caller can choose a route that is cheaper for the callee but is costlier for the caller. For example, in case the call is routed directly to the callee visited network from the caller prevailing network, the callee may not have to pay for receiving the call. However, the caller may have to pay more to route the call directly to the callee visited network than to route the call through the callee home network. The caller prevailing network can inform the caller about the cost. The caller can, still, route the call directly to the callee visited network in interest of the callee, even if the caller has to pay more.

System 400 further comprises an alerting module 420, alerting module 420 alerts the callee in a different fashion, in case the call is connected directly from the caller prevailing network to the callee visited network.

Various embodiments of the present invention provide a method and a system for minimizing a cost of routing calls when a callee is roaming, without adversely affecting the caller. The method and the system proposed in the present invention can be easily incorporated in conventional communication networks and may not require additional hardware. Moreover, a caller may not be required to have an additional device or perform additional actions. The present invention can also work with next generation backbone networks and protocols. For example, in case of Session Initiation Protocol (SIP), the present invention can use a REDIRECT signaling message provided by the SIP protocol if the caller decides to reroute the call.

Also, the present invention is not dependent on underlying signaling network and protocols, for example the present invention can be deployed in Signaling System 7 protocol (SS7), Channel Associated Signaling, Signaling System 5 (CAS-SS5) or SIP.

In the foregoing specification, specific embodiments of the present invention have been described. However, one of ordinary skilled in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims.

What is claimed is:

1. A computer-implemented method for routing a call in a mobile communication network, the method comprising:
   receiving, by a computer, a message by a caller prevailing network, corresponding to a call from a callee home network when the callee is roaming in a callee visited network, wherein the message is received in response to the call initiated by the caller for the callee, and wherein the message comprises a redirection information to the callee visited network;
   solving, by the computer, a predefined criterion for routing the call, wherein:
      the predefined criterion is solved based on the redirection information in the message,
      the predefined criterion comprises comparing a first cost and a second cost, the first cost corresponding to directly routing the call to the callee visited network from the caller prevailing network, the second cost corresponding to indirectly routing the call to the callee visited network from the caller prevailing network through the callee home network to the callee visited network;
   selecting, by the caller, one of a first-routing option and a second-routing option by the computer,
      the first-routing option corresponding to the first cost being less than the second cost and resulting in directly routing the call from the caller prevailing network to the callee visited network, and
      the second-routing option corresponding to the first cost being greater than or equal to the second cost and resulting in indirectly routing the call from the caller prevailing network though the callee home network to the callee visited network; and
   connecting the call and alerting the callee that the call is direct to the callee visited network from the caller prevailing network.

2. The method of claim 1, further comprising initiating the call by the caller for the callee.

3. The method of claim 1, wherein the redirection information comprises a temporary number corresponding to the callee, the temporary number is assigned to the callee by the callee visited network, wherein the call is directly connected using the temporary number.

4. The method of claim 1, wherein the redirection information comprises an address of a Mobile Switch Centre (MSC) of the callee visited network, the call is routed to the callee visited network based on the address of the MSC.

5. The method of claim 1, wherein the callee is alerted by flashing an alert message on an electronic device used by the callee to receive the call.

6. A computer-implemented method for minimizing cost of a roaming call in a mobile communication network, the method comprising:
   receiving, by a computer, a message by a caller prevailing network, corresponding to a call from a callee home network when the callee is roaming in a callee visited network, wherein the message is received in response to the call initiated by the caller for the callee, and wherein the message comprises redirection information to the callee visited network;
   calculating a first cost and a second cost, wherein the first cost corresponds to directly routing the call to the callee visited network from the caller prevailing network based on the information in the message, and the second cost corresponds to indirectly routing the call to the callee visited network from the caller prevailing network through the callee home network to the callee visited network;
   comparing the first cost with the second cost;
   directly or indirectly routing the call based on the lesser of the first cost and the second cost, respectively; and
   connecting the call and alerting the callee that the call is direct to the callee visited network from the caller prevailing network.

7. A system for routing a call in a mobile communication network, the system comprising:
   a messaging sub-module, wherein the messaging sub-module sends a message from a callee home network when the callee is roaming in a callee visited network, the message being sent in response to a call initiated by a caller, wherein the message comprises redirection information to the callee visited network;
   a routing-rule module, wherein the routing-rule module solves a predefined criterion for routing the call, the predefined criterion being solved based on the redirection information in the message, wherein:
      the predefined criterion comprises comparing a first cost and a second cost, the first cost corresponding to directly routing the call to the callee visited network from the caller prevailing network, the second cost corresponding to indirectly routing the call to the callee visited network from the caller prevailing network through the callee home network to the callee visited network; and the routing comprises a selection by the caller of one of a first-routing option and a second-routing option by the computer, the first-routing option corresponding to the first cost being less than the second cost and resulting in directly routing the call from the caller prevailing network to the callee visited network, and the second-routing option corresponding to the first cost being greater than or equal to the second cost and resulting in indirectly routing the call from the caller prevailing network though the callee home network to the callee visited network; and an alerting module, wherein the alerting module alerting the callee if the call is routed to the callee visited network from the caller prevailing network based on the redirection information in the message.

8. The system of claim 7, wherein the routing-rule module comprises an option-providing module, the option-providing module configured for:

providing at least one of a first-routing-option and a second-routing-option to the caller, the first-routing-option corresponding to the first cost, the second-routing-option corresponding to the second cost.

9. The system of claim 8, wherein the predefined criterion comprises the caller selecting one of a first-routing-option and a second-routing-option.

* * * * *